United States Patent [19]

Sahajpal et al.

[11] 4,133,788

[45] Jan. 9, 1979

[54] POLYMER LATEX WHICH IS CROSS-LINKED WITH A DIALKYL TIN DIACRYLATE IN THE PREPARATION OF GRAFTED COPOLYMERS

[75] Inventors: Ved K. Sahajpal, Br Oudorp, NH, Netherlands; Larry D. Sarver, New Martinsville, W. Va.; Claude C. Deegan, Belpre, Ohio

[73] Assignee: Borg-Warner Corporation, Chicago, Ill.

[21] Appl. No.: 871,298

[22] Filed: Jan. 23, 1978

[51] Int. Cl.$^2$ .............................................. C08L 51/04
[52] U.S. Cl. .................... 260/29.7 UP; 260/29.7 UA; 260/876 R; 260/880 R
[58] Field of Search .............. 260/29.7 UP, 29.7 UA, 260/880 R, 876 R

[56] References Cited

U.S. PATENT DOCUMENTS

| | | | |
|---|---|---|---|
| 2,985,631 | 5/1961 | Jones et al. | 260/880 R |
| 3,671,610 | 6/1972 | Amagi et al. | 260/880 R |
| 3,887,652 | 6/1975 | Carrock et al. | 260/880 R |

FOREIGN PATENT DOCUMENTS 545114  5/1942  United Kingdom ............... 260/880 R

*Primary Examiner*—M. J. Welsh
*Attorney, Agent, or Firm*—Joseph Shekleton

[57] ABSTRACT

A polymer latex which is cross-linked by a dialkyl tin diacrylate. The latex is a good substrate for the preparation of graft copolymers which are effective to impart good impact and high stress whitening properties to vinyl chloride polymers.

14 Claims, No Drawings

POLYMER LATEX WHICH IS CROSS-LINKED WITH A DIALKYL TIN DIACRYLATE IN THE PREPARATION OF GRAFTED COPOLYMERS

This invention relates to improved vinyl chloride polymer compositions. More particularly, it relates to certain graft copolymers of methyl methacrylate and styrene grafted onto a cross-linked rubbery substrate; these copolymers have good clarity and processability and are compatible with vinyl chloride polymers to form compositions having good stress whitening properties and impact strength.

Graft copolymers wherein a rigid phase is grafted onto a rubbery phase are well known. They have good mechanical strength and are useful in the manufacture of shaped articles. They are useful also to impart desirable properties such as impact strength to normally frangible polymers such as ABS and polyvinyl chloride; at the same time, the other desirable properties of the ABS and polyvinyl chloride are not diminished.

However, many of the graft copolymers of this type, while effective to improve the impact resistance of vinyl chloride polymers, suffer disadvantages having to do with transparency and color. In many instances, where a shaped vinyl chloride polymer article is involved, it is important that the article be transparent or, at least, that it be relatively colorless. It thus frequently is necessary to sacrifice one or more desirable properties in the manufacture of a vinyl chloride polymer article, e.g., some transparency may have to be sacrificed for the desired impact strength, or some impact strength may have to be sacrificed so that optimum transparency can be had.

Obviously, it would be better if no such sacrifices had to be made. It would be better if shaped vinyl chloride polymer articles could be made available that had satisfactory impact strength and satisfactory transparency.

Souza, U.S. Pat. No. 2,925,625, shows the use of vinyl chloride polymers to prepare color contrasting embossments. These are prepared by applying stress to a rigid, ductile polymer and thereby causing deformation to form the embossment. The deformation is accompanied by a whitening of the polymer in the area of the deformation. Souza, U.S. Pat. No. 2,996,822, Souza, U.S. Pat. No. 3,036,945, and Anderson, U.S. Pat. No. 3,047,443, also deal with this subject matter.

The process of the present invention makes available such products, i.e., products having both good impact strength and transparency, as well as stress whitening and satisfactory processability. It is a process for preparing a graft copolymer of styrene and methyl methacrylate as a superstrate on a copolymer of butadiene and styrene as the substrate, which graft copolymer is compatible with vinyl chloride polymers, comprising:

(a) preparing a polymer latex by polymerizing butadiene or a mixture of butadiene and styrene, in the presence of a small proportion of a dialkyl tin diacrylate cross-linking agent;

(b) adding to said latex a mixture of methyl methacrylate and styrene; and (c) polymerizing said mixture of (b).

Prior art processes have generally employed divinyl benzene as the cross-linking agent (in step a) but larger amounts of divinyl benzene are required to achieve the same level of beneficial properties as is required when a given amount of dialkyl tin diacrylate is used. In certain respects, e.g., where the graft copolymer is used to modify a vinyl chloride polymer, the use of a small amount of a dialkyl tin diacrylate cross-linking agent (in step a) results in a product having very good stress whitening properties.

The polymerization mixture of (a) may also contain acrylonitrile in amounts up to 10% of the total amount of monomers. Thus, the mixture may contain butadiene alone, butadiene and styrene, and acrylonitrile, or butadiene, styrene and acrylonitrile. Up to 70% of styrene, based on the total amount of monomers, may be used.

The dialkyl tin diacrylate has the structure $R_2Sn(OCOCH=CH_2)_2$ where R is alkyl. The alkyl preferably is lower alkyl, i.e., one having 1-10 carbon atoms. Illustrative alkyl groups include methyl, ethyl, propyl, butyl, hexyl, octyl and decyl groups. Especially preferred are those alkyl groups of 1-4 carbons. The alkyl groups may be the same or different, although in the usual case, because of their ease of preparation, those dialkyl tin diacrylates are preferred where the alkyl groups are the same.

The dialkyl tin diacrylates can be prepared conveniently by the reaction of the corresponding dialkyl tin oxide and acrylic acid, as illustrated below:

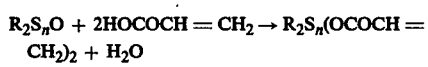

$$R_2Sn O + 2HOCOCH=CH_2 \rightarrow R_2Sn(OCOCH=CH_2)_2 + H_2O$$

The reaction normally is carried out in an organic, water-immiscible solvent such as benzene and the water produced in the reaction is removed azeotropically. Alternatively, the reaction can be carried out at a somewhat higher temperature and the water is distilled away as it is formed. See "Chemistry of Organotin Compounds" by R. C. Poller, Academic Press, New York (1970), p. 173.

As indicated, the amount of dialkyl tin diacrylate used as a cross-linking agent need not be large, based on the amounts of prior art cross-linking agents ordinarily used. From about 0.05% to about 1.0%, based on the total weight of monomer, should be used.

In step (b), the mixture of methyl methacrylate and styrene generally contains approximately equal amounts, by weight, of these monomers. From 30-70 parts of methyl methacrylate and 30-70 parts of styrene are contemplated.

A preferred specific embodiment of the invention involves the use of a cross-linking agent in the polymerization mixture of step (b). While this cross-linking agent may be of the same type as that required in step (a), i.e., a dialkyl tin diacrylate, other types are likewise contemplated, including divinyl benzene, triallyl phosphate, diallyl phthalate, triallyl cyanurate, tetraallyl silane, tetramethallyl silane, ethylene glycol diacrylate, ethylene glycol dimethacrylate, dialkyl itaconate, allyl acrylate, polyethylene glycol diacrylate and the like. Generally, though, when a cross-linking agent is used in step (c), it will be a dialkyl tin diacrylate, as contemplated in step (a), or divinyl benzene. The quantity of cross-linking agents to be used in this step is from 0.01% to 5%, based on the total weight of monomer.

The conditions under which the polymerizations of steps (a) and (b) are to be carried out, the catalysts to be used, etc., are all well known in the art and do not constitute a part of this invention.

Preparation of the polymeric composition herein is illustrated by the following examples.

EXAMPLE 1

A mixture of 0.8 part of dibutyl tin diacrylate, 28.5 parts of styrene, 3.0 parts of 15% aqueous potassium oleate and 145 parts of water is prepared and heated to 136° F., then treated with butadiene to a pressure of 74 psig. A mixture of 0.05 part of 11.1% aqueous azobisisobutyronitrile and 5.0 parts of an aqueous xanthan gum solution is added. These conditions of pressure and temperature are maintained for 15 hours and then the temperature is maintained at 154°-162° F. for an additional 11 hours, during which time the butadiene pressure is gradually reduced to 8 psig. A total of 70 parts of butadiene is consumed. The product mixture is filtered through cheesecloth to yield 231.7 parts of latex having a solids content (the cross-linked copolymer of styrene and butadiene) of 38.7%, a pH of 9.0 and a steam distillation value of 5.5.

EXAMPLE 2

To a mixture of 65.0 parts of the latex product of Example 1 and 178 parts of water at 140° F., there is added, separately and portionwise over a period of one hour, (1) a mixture of 17.5 parts of methyl methacrylate, 2.0 parts of acrylonitrile and 15.5 parts of styrene; (2) 0.275 part of 80% aqueous cumene hydroperoxide; and (3) a solution of 0.015 part of ferrous sulfate heptahydrate, 0.045 part of 48% aqueous trisodium ethylene diamine tetraacetic acid, and 0.15 part of sodium formaldehyde sulfoxylate in 1.50 parts of water. After 10 minutes of this one-hour period at 140° F., the temperature is raised to 160° F. and held there for the remaining 50 minutes and for an additional two hours. At the end of this period a solution of 2.0 parts of 15% aqueous potassium oleate and 0.45 part of sodium hydroxide in 30 parts of water is added. The polymerization mixture is agitated mildly throughout and then filtered through cheesecloth to yield 306 parts of latex (a graft copolymer of methyl methacrylate, acrylonitrile and styrene on a substrate copolymer of styrene and butadiene). Its pH is 10.3; total solids: 33.6%.

EXAMPLE 3

The procedure of Example 1 is repeated, omitting the dioctyl tin diacrylate from the polymerization mixture and substituting for it 2.0 parts of divinyl benzene.

EXAMPLE 4

The procedure of Example 3 is repeated, substituting the divinyl benzene cross-linked copolymer product of the procedure of Example 3 for the cross-linked copolymer product of the procedure of Example 1.

EXAMPLE 5

Vinyl chloride polymer compositions containing the resin products of Examples 2 and 4 are prepared according to the following formulation:

| | |
|---|---|
| Vinyl Chloride Polymer | 100.0 parts |
| Di-n-octyl tin-S,S'-bis (isooctyl mercaptoacetate) | 1.2 parts |
| Triglyceride Lubricant | 0.6 part |
| Montanic Acid Triglyceride | 0.8 part |
| Resin Product of Example 2 (or Example 4) | 13.0 parts |

The torque rheology of the compositions herein is conveniently measured by a Brabender apparatus. The apparent viscosity of the resin is determined while it is subjected to mechanical mixing and shear at a specified temperature, thereby obtaining an evaluation of the resin under conditions akin to those of processing conditions. The test results are melt viscosities, expressed in metergrams. Table I shows such test results obtained from the resin products of Example 2 (of the invention) and Example 4 (a control). Readings are taken at 15 minutes and 20 minutes (after the resin had completely melted). The temperature is maintained at 180° C., and the melted resin is stirred at 30 rpm.

TABLE I

| Resin | Torque (mg.) | |
|---|---|---|
| | After 15 Minutes | After 20 Minutes |
| Example 2 | 2200 | 2200 |
| Example 4 | 2300 | 2300 |

It will be noted that the viscosity of the resin of Example 2 is slightly less than that of the resin of Example 4, indicating the relative ease of processability of the former. It will be recalled that much less cross-linking agent is necessary to prepare the resin of Example 2.

The clarity of the graft copolymers herein is apparent from a consideration of the percent luminous transmission and percent haze of the resin products of Examples 2 and 4.

TABLE II

| Resin | Luminous Transmission | Haze |
|---|---|---|
| Example 2 | 89.1% | 2.1% |
| Example 4 | 89.3% | 3.1% |

Again, the clarity of the graft copolymers herein is seen to be of the same general order as that of the prior art (the resin of Example 4) and, in fact, there is a slight improvement with respect to haze.

The stress whitening properties of vinyl chloride polymers modified by the graft copolymers of the invention are shown by the data contained in Table III. In most applications, stress whitening is regarded as a disadvantage because it reduces clarity and aesthetic appeal. This "disadvantage," however, is a very desirable property in polymer compositions used in developing contrasting embossments. This property permits the easy preparation of signs, labels, etc.

Relatively small proportions of the graft copolymer of the invention are sufficient to impart the above-improved stress whitening to a vinyl chloride polymer. From about five pph (parts per hundred parts of vinyl chloride polymer) to about 20 pph are contemplated.

Vinyl chloride polymers contemplated herein as having stress whitening characteristics susceptible to improvement by the graft copolymers herein include homopolymers of vinyl chloride and copolymers of vinyl chloride with minor proportions, i.e., less than 20% of one or more other monomers copolymerizable therewith. These include vinyl acetate, vinyl stearate, vinylidene chloride, methyl acrylate, butyl acrylate, ethyl methacrylate, 2-ethyl-hexyl methacrylate, diethyl maleate, di-n-hexyl fumarate and the like.

The data in Table III is obtained from a test which measures the degree of stress whitening produced by a controlled mechanical stress on a clear, rigid, impact modified vinyl chloride polymer. Test specimens are prepared by milling for four minutes at 325° F. and then drawing off a 30-mil sheet which is cut into six strips. These strips then are each stretched lengthwise on an Instron device 90% of their length. The average percent light transmittance of the thus stressed specimens is determined, compared with that of an unstressed specimen (as the denominator) and the percent light retained taken as a measure of stress whitening.

The vinyl chloride polymer compositions for which data is set out in Table III are those described in Example 5.

TABLE III

| Resin | Stress Whitening |
|---|---|
| Example 2 | 68% |
| Example 4 | 27% |

The impact strengths of the same vinyl chloride polymer compositions show the effectiveness of the graft polymers of the invention in imparting this quality to vinyl chloride polymers. The notched Izod impact values (for ¼" bars) are 705 kg.-cm./cm.$^2$ (for the vinyl chloride polymer modified as above by the resin product of Example 2) and 593 kg.-cm./cm.$^2$ (for the vinyl chloride polymer modified as above by the resin product of Example 4). The corresponding Izod values for ⅛" bars are 1000 and 1100, respectively.

All parts and percentages herein, unless otherwise specifically defined, are by weight.

We claim:

1. A process for preparing a graft copolymer of styrene and methyl methacrylate as a superstrate grafted on a copolymer of butadiene and styrene as the substrate, which graft copolymer is compatible with vinyl chloride polymers, comprising:
   (a) preparing a polymer latex by polymerizing butadiene or a mixture of butadiene and styrene, in the presence of a small proportion of a dialkyl tin diacrylate cross-linking agent;
   (b) adding to said latex a mixture of methyl methacrylate and styrene; and
   (c) polymerizing said mixture of (b).

2. The process of claim 1 wherein the mixture of (b) contains up to 10%, based on said mixture, of acrylonitrile.

3. The process of claim 1 wherein step (a) comprises of polymerizing a mixture of butadiene and up to 70% of styrene.

4. The process of claim 1 wherein the alkyl groups of the dialkyl tin diacrylate each contain 1–10 carbon atoms.

5. The process of claim 1 wherein the amount of dialkyl tin diacrylate is from about 0.05 to about 1.0%, based on the total amount of monomer.

6. The process of claim 1 wherein the mixture of (b) contains 30–70 parts of methyl methacrylate and 30–70 parts of styrene.

7. The process of claim 6 wherein the mixture of (b) contains up to 10 parts of acrylonitrile.

8. The process of claim 1 wherein the polymerization reaction of step (c) is carried out in the presence of a cross-linking agent.

9. The process of claim 1 wherein step (c) is carried out in the presence of an effective amount of a dialkyl tin diacrylate.

10. The process of claim 9 wherein the alkyl groups of the dialkyl tin diacrylate of step (c) each contains 1–10 carbon atoms.

11. The graft copolymer prepared by the process of claim 1.

12. A polymer composition having improved stress whitening properties comprising a major proportion of a vinyl chloride polymer and a minor proportion, sufficient to improve the stress whitening properties of the vinyl chloride polymer, of the graft copolymer of claim 11.

13. A process for preparing a polymer latex comprising polymerizing butadiene or a mixture of butadiene and styrene in the presence of a small proportion of a dialkyl tin diacrylate cross-linking agent.

14. The product of the process of claim 13.

* * * * *